(12) United States Patent
Flynn et al.

(10) Patent No.: US 8,738,696 B2
(45) Date of Patent: May 27, 2014

(54) SINGLE SUBSCRIPTION MANAGEMENT FOR MULTIPLE DEVICES

(75) Inventors: Judson John Flynn, Decatur, GA (US); Erick John Haughn, Norcross, GA (US); John Lewis, Lawrenceville, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 528 days.

(21) Appl. No.: 12/361,552

(22) Filed: Jan. 29, 2009

(65) Prior Publication Data

US 2010/0189096 A1  Jul. 29, 2010

(51) Int. Cl.
*G06F 15/16* (2006.01)

(52) U.S. Cl.
USPC ........... 709/204; 709/203; 455/425; 455/436; 455/444; 455/455

(58) Field of Classification Search
USPC ........... 455/425, 436, 444–445; 709/203, 204
See application file for complete search history.

(56) References Cited

U.S. PATENT DOCUMENTS

| | | | | |
|---|---|---|---|---|
| 7,245,913 B1 * | 7/2007 | Nguyen et al. | ............. | 455/435.2 |
| 7,715,790 B1 * | 5/2010 | Kennedy | ............. | 455/41.2 |
| 7,890,090 B2 * | 2/2011 | Hansen et al. | ............. | 455/417 |
| 8,248,923 B2 * | 8/2012 | Czaja et al. | ............. | 370/229 |
| 2002/0160757 A1 * | 10/2002 | Shavit et al. | ............. | 455/414 |
| 2005/0215238 A1 * | 9/2005 | Macaluso | ............. | 455/414.1 |
| 2006/0109811 A1 * | 5/2006 | Schotten et al. | ............. | 370/328 |
| 2008/0037525 A1 * | 2/2008 | Karaoguz et al. | ............. | 370/352 |
| 2008/0108301 A1 * | 5/2008 | Dorenbosch | ............. | 455/3.06 |
| 2008/0220779 A1 * | 9/2008 | Bose | ............. | 455/436 |
| 2008/0318561 A1 * | 12/2008 | Olshansky et al. | ............. | 455/417 |
| 2009/0067417 A1 * | 3/2009 | Kalavade et al. | ............. | 370/356 |
| 2009/0104946 A1 * | 4/2009 | Khandourl | ............. | 455/569.2 |
| 2010/0167694 A1 * | 7/2010 | Chiussi et al. | ............. | 455/411 |
| 2011/0059732 A1 * | 3/2011 | Cai et al. | ............. | 455/417 |

* cited by examiner

*Primary Examiner* — Duyen Doan
(74) *Attorney, Agent, or Firm* — Amin, Turocy & Watson, LLP

(57) ABSTRACT

System(s) and method(s) are provided that facilitate managing routing voice and data traffic, associated with a subscription, when there are multiple devices. A client component can manage which communication device of multiple communication devices of a subscriber is active on the network at a given time for the subscriber based in part on location of a mobile device associated with the subscriber, a subscriber profile, and predefined routing criteria, which can facilitate optimal device selection. The mobile device can communicate via a macro network when outside of an area served by consumer premise equipment of the subscriber; and when the mobile device is in the area served by the consumer premise device, voice and data traffic directed to the mobile device can be automatically routed to one of multiple communication devices connected to the consumer premise equipment. The subscriber profile can specify routing preferences of the subscriber.

22 Claims, 9 Drawing Sheets

SINGLE SUBSCRIPTION MANAGEMENT FOR MULTIPLE DEVICES

TECHNICAL FIELD

The subject innovation relates to networked communications and, more particularly, to single subscription management for multiple devices.

BACKGROUND

A subscriber often can have many devices (e.g., personal computer, Internet Protocol Television (IPTV), laptop computer, home phone, mobile phone, etc.) that can be utilized to transmit and/or receive voice and data communications. Typically, a subscriber can have a home computer and a home phone (e.g., Voice over Internet Protocol (VoIP)-based phone) that can be connected to a broadband connection or consumer premise equipment (CPE) (e.g., home base station, such as a femtocell or picocell) to facilitate high-speed communication of data. Often, a subscriber also can utilize a mobile phone that can be used for wireless voice and/or data communications via a macro network (e.g., macro cellular network), a home base station, a Wi-Fi network, or other type of network. While the mobile device can utilize the macro network to facilitate communications from virtually any location serviced by the macro network, the processing speed of a mobile device typically can be more limited than a personal computer, and the transmission/reception speeds on the macro network can be slower than the transmission/reception speeds associated with a broadband or other-high speed connection. Further, the user interface (e.g., graphical user interface (GUI)) on a mobile phone typically has more limited functionality and is more limited in size than a personal computer. Moreover, mobile devices typically are operated off of battery power, where the battery can have a limited useful life.

When the subscriber enters a location, such as home or work, with the subscriber's mobile device, the subscriber also can have access to other communication devices, such as a personal computer, IPTV, VoIP phone, etc., that can be connected to a broadband connection or a home base station that can provide high-speed data communications. When there is a communication (e.g., voice, data) associated with the mobile device while the subscriber is at such a location where other communication devices are accessible, it can be desirable to leverage such other communication devices for voice and data communications, instead of using the mobile phone, as doing so can result in decrease in traffic on the macro network, efficient communication of voice and data via a high-speed communication connection, and reduction in power usage of the mobile phone, which can improve the useful life of the battery of the mobile phone, for example.

SUMMARY

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The subject innovation provides system(s), method(s), and device(s) that can facilitate managing routing of voice and data traffic, associated with a subscription of a subscriber, when there are multiple communication devices associated with the subscriber. In an aspect, a client component can facilitate managing and/or determining which communication device of the multiple communication devices of the subscriber is active on the network at a given time for the subscriber based at least in part on a current location of a mobile device associated with the subscriber, routing preferences contained in a subscriber profile of the subscriber, and/or predefined routing criteria, which can facilitate optimal communication device selection. The subscriber can access the subscriber profile via a web interface and can specify routing parameters, or at least a portion of routing parameters, to facilitate selecting at least a portion of routing preferences with regard to routing of voice or data communications directed to the mobile device when the mobile device is within a coverage area served by consumer premise equipment (CPE) (e.g., home base station, comprising a femtocell and/or broadband components) associated with the subscriber. The client component can facilitate storing the subscriber profile in a policy database. In accordance with an embodiment, the client component and policy database can reside within the CPE or on the home network side; in accordance with another embodiment, the client component and policy database can reside within the core network in the wireless communications environment.

When the mobile device is outside a coverage area served by the CPE, the mobile device can communicate via a macro network. When the mobile device is within the coverage area served by the CPE of the subscriber, the client component can facilitate automatically routing voice and data traffic, initially directed to the mobile device, to one of the multiple communication devices (e.g., landline or Voice over Internet Protocol (VoIP) phone, Internet Protocol Television (IPTV), computer, the mobile device (as desired), etc.) connected to the CPE based at least in part on the routing parameters, for example, as specified in the subscriber profile. The client component can retrieve at least a portion of the routing parameters from the subscriber profile, which can be stored in the policy database, and can automatically route the voice or data communication to a desired communication device connected to the CPE in accordance with the portion of routing parameters and/or other routing criteria.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings.

DETAILED DESCRIPTION

Figure 1:
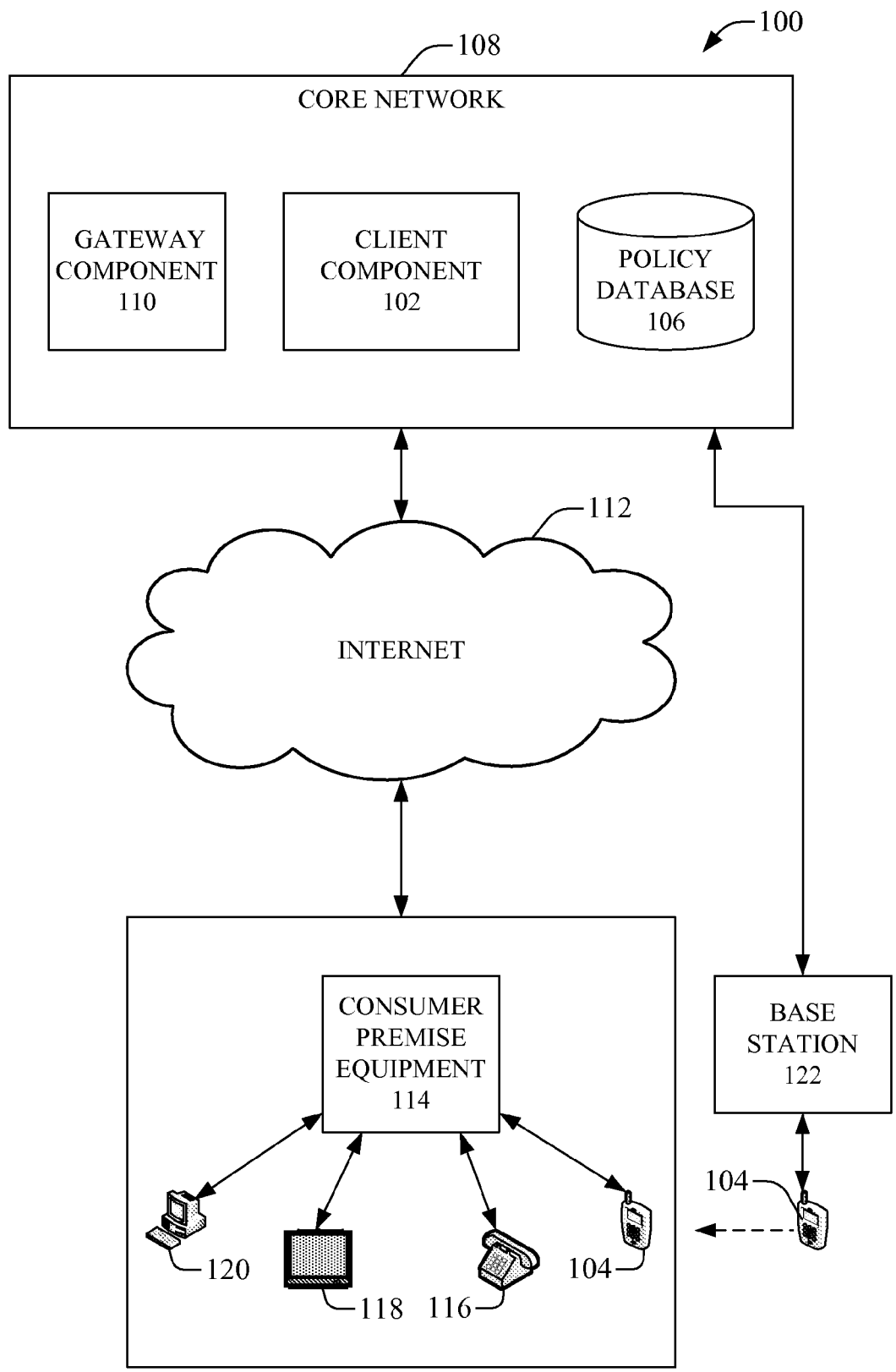
FIG. 1 is a diagram of an example system that can facilitate management of routing of voice traffic and/or data traffic to a desired communication device of a plurality of communication devices associated with a subscription in accordance with various aspects and embodiments of the disclosed subject matter.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present subject innovation.

The following abbreviations are relevant to the subject specification.
3G Third Generation
3GPP Third Generation Partnership Project
AGPS Assisted GPS
AP Access Point
ADSL Asymmetric Digital Subscriber Line
AWS Advanced Wireless Services
BRAS Broadband Remote Access Server
BTA Basic Trading Area
CN Core Network
CS Circuit-Switched
CSCF Call Session Control Function
CPE Customer (or Consumer) Premise Equipment
CPN Customer (or Consumer) Premise Network
DHCP Dynamic Host Configuration Protocol
DSL Digital Subscriber Line
DSLAM Digital Subscriber Line Access Multiplexer
E911 Enhanced 911
FCC Federal Communications Commission
FL Forward Link
GGSN Gateway GPRS Service Node
GPRS General Packet Radio Service
GPS Global Positioning System
GW Gateway
HAP Home Access Point
HSS Home Subscriber Server
ISDN Integrated Services Digital Network
UE User Equipment
UTRAN Universal Terrestrial Radio Access Network
IMS IP Multimedia Subsystem
IP Internet Protocol
ISP Internet Service Provider
MSA Metropolitan Statistical Areas
MSISDN Mobile Subscriber ISDN Number
MTA Major Trading Areas
NAT Network Address Translation
NTP Network Time Protocol
O&M Operation and Maintenance
PC Personal Computer
PCS Personal Communications Service
PS Packet-Switched
PSTN Public Switched Telephone Network
RAN Radio Access Network
RBS Radio Base Station
RL Reverse Link
RNC Radio Network Controller
RSA Rural Service Area
SGSN Serving GPRS Support Node
SIP Session Initiation Protocol
USSD Unstructured Supplementary Service Data
VPN Virtual Private Network
WAP Wireless Application Protocol
XDSL Asynchronous-DSL or Synchronous-DSL.

As used in this application, the terms "component," "system," "platform," "service," "framework," "interface," "node," and the like are intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment," "mobile station," "mobile," subscriber station," "mobile device," "mobile communication device," "access terminal," "terminal," "mobile handset," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "home Node B (HNB)," and the like, are utilized interchangeably in the subject application, and refer to a wireless network component or appliance that serves and receives data, control, voice, video, sound, gaming data, or substantially any data-stream or signaling-stream from a set of subscriber stations. Data (e.g., voice or data communications) and signaling streams can be packetized or frame-based flows.

Furthermore, the terms "user," "subscriber," "customer," "consumer," "agent," and the like are employed interchangeably throughout the subject specification, unless context warrants particular distinction(s) among the terms. It should be appreciated that such terms can refer to human entities or automated components supported through artificial intelligence (e.g., a capacity to make inferences based on complex mathematical formalisms) which can provide simulated vision, sound recognition, and so forth.

FIG. 1 is a diagram of an example system 100 that can facilitate management of routing of voice traffic and/or data traffic to a desired communication device of a plurality of communication devices associated with a subscription in accordance with various aspects and embodiments of the disclosed subject matter. In an aspect, the system 100 can comprise a client component 102 that can be employed to facilitate management of routing of voice and/or data traffic to a desired communication device of a plurality of communication devices associated with a subscription (e.g., subscription to voice services and/or data services, including those associated with a wireless communication network) of a subscriber based at least in part on a current location of a mobile device 104 (e.g., mobile communication device, such as a cellular phone) associated with the subscriber, a subscriber profile associated with the subscriber, and predefined routing criteria. The subscriber can specify the priority, or at least a portion of the priority, of routing with regard to the communication devices of the subscriber, where the routing preferences (e.g., as indicated by corresponding routing parameters) of the subscriber can be stored in a subscriber profile, which can be stored in a policy database 106 associated (e.g., connected) with the client component 102.

In accordance with an aspect of the subject innovation, the routing parameters (e.g., priority scheme) for routing voice or data communications associated with the mobile device 104 can be based at least in part on network presence servers, registration between various networks, such as cellular networks (e.g., Universal Mobile Telecommunications System (UMTS), Global System for Mobile Communications (GSM), Core Division Multiple Access (CDMA), etc.), unlicensed spectrum (e.g., Wi-Fi), and/or macro base stations or consumer premise equipment (CPE) (e.g., home or work femtocell-based base station). The routing parameters can be flexible in allowing a subscriber to select traffic routing in accordance with desired routing preferences of the subscriber or an optimal transport layer (e.g., broadband associated with the CPE of the subscriber; cellular network).

In accordance with an embodiment, the client component 102 and policy database 106 can reside in a core network 108, which can facilitate wireless communication between communication devices (e.g., mobile device 104, computer with a wireless connection, etc.) in a wireless communication environment. The client component 102 also can be connected to a gateway component 110 in the core network 108, where the gateway component 110 can facilitate communicating data (e.g., transmitting data to, receiving data from) to/from communication devices via the Internet 112.

The system 100 also can comprise a CPE 114, which can be associated with the subscriber, where the CPE 114 can be connected to the gateway component 110 via the Internet 112, and can comprise a cell (e.g., home base station), such as a femtocell or picocell, and/or a broadband component(s) (e.g., Digital Subscriber Line (DSL), T1/E1 line, Worldwide Interoperability for Microwave Access (WiMax), Wi-Fi, etc.) that can facilitate wired and/or wireless communication of voice traffic and data traffic between a communication device(s) connected to the CPE 114 and/or other communication devices in the communication environment. The CPE 114 can support connectivity for voice communications, data communications, video access, etc. The CPE 114 can be located in the home, place of employment, or other desired place, associated with the subscriber, for example. In an aspect, a plurality of communication devices, including a mobile device 104 (e.g., when within the coverage area of the CPE 114), a phone 116 (e.g., landline phone, Voice over Internet Protocol (VoIP) phone), an Internet Protocol Television (IPTV) 118, and/or a computer 120, and/or other communication devices (e.g., digital video recorder (DVR), digital music recorder/player, electronic game, another computer, etc.) (not shown), can be connected (e.g., via a wired connection or wireless connection) to CPE 114 of the subscriber.

In accordance with an aspect, when the mobile device 104 of the subscriber is outside (or inside, as desired) the coverage area associated with the CPE 114, the mobile device 104 can be served by a base station 122 (e.g., macro cell) that can facilitate wireless communications in the area where the mobile device 104 is located in the wireless communication environment. In one aspect, the base station 122 can serve a coverage macro cell area, where the base station 122 can service mobile wireless devices, such as mobile device 104 (e.g., when the mobile device 104 is outside the coverage area associated with CPE 114), and such coverage can be achieved via a wireless link (e.g., uplink (UL), downlink (DL)). In an aspect, the mobile device 104 can be a 3GPP Universal Mobile Telecommunication System (UMTS) mobile phone, for example. When an attachment attempt is successful, the mobile device 104 can be served by base station 122 and incoming voice and data traffic can be paged and routed to the mobile device 104 through the base station 122, and outgoing voice and data traffic from the mobile device 104 can be paged and routed through the base station 122 to other communication devices.

When the mobile device 104 is within the coverage area associated with the CPE 114, the client component 102 can facilitate automatically routing voice or data traffic (e.g., phone call; short message service (SMS) message; an enhance messaging service (EMS) message; a multimedia messaging service (MMS) message; email; downloading of audio, video, or multimedia content; content related to electronic gaming; Internet traffic (e.g., web pages); etc.) directed to the mobile device 104 to a specified communication device, such as a phone 116, an IPTV 118, or a computer 120 (or the mobile device 104, as desired), based at least in part on the subscriber profile stored in the policy database 106 and/or the predefined routing criteria. The CPE 114 can comprise a router(s) that can be utilized to route the voice or data traffic to the desired communication device connected to the CPE 114 based at least in part on the policy routing (e.g., routing preferences) provided in the subscriber profile. In an aspect, the gateway component 110 and the client component 102 can be configured to facilitate routing voice or data communications in a most desired cost (e.g., least or best cost) and/or most preferred (e.g., subscriber preferred, network preferred) routing manner to facilitate efficient routing of communications. The gateway component 110 can have information indicating the bearer network of the mobile device 104 and location information regarding the mobile device 104 to facilitate desired routing of a communication initially directed to the mobile device 104. In an aspect, the client component 102 can employ a location-based service (LBS) (e.g., global positioning system (GPS)-based LBS) that can be utilized to facilitate determining the location of the mobile device 104 in order to determine whether the mobile device 104 is within the coverage area of the CPE 114.

In an aspect, the predefined routing criteria can relate to, for example, the time of day when the communication is being routed, the respective types of communication devices to which the communication can be routed (e.g., communication devices connected to CPE 114), respective available resources or functionality of the communication device to which the communication can be routed, the type of communication being routed, the available resources associated with the core network 108 at the time of the communication, type(s) of coverage or access available with the subscription of the subscriber, etc. In yet another aspect, as desired, the client component 102 can transmit a routing message that can be displayed in the user interface of the mobile device 104, where the routing message can indicate that a voice communication or data communication is being routed to a particular communication device (e.g., phone 116, IPTV 118, computer 120).

In another aspect, the client component 102 can facilitate enabling a subscriber to create a subscriber profile, which can contain desired routing preferences of the subscriber, where the subscriber profile can be utilized to facilitate routing of communications directed to the mobile device 104. The subscriber can utilize a communication device (e.g., mobile device 104, computer 120) to access a web interface associated with the client component 102 to facilitate creating the subscriber profile. In yet another aspect, the client component 102 can facilitate recommending optimal routing settings, based at least in part on the predefined routing criteria, to the subscriber to facilitate selection of desirable (e.g., optimal) routing of voice or data traffic to communication devices associated with the subscriber.

For example, based at least in part on the predefined routing criteria, the client component 102 can recommend to the subscriber that video content directed to the mobile device 104 be routed to the IPTV 118 when the mobile device 104 is within the coverage area of the CPE 114 due in part to the faster download speed that can be realized by the CPE 114 as compared to the download speed that can be achieved by the mobile device 104 via the macro network (e.g., via base station 122) and/or the larger interface (e.g., screen) of the IPTV 118. The subscriber can select the recommended routing options, as desired.

As an example of routing of communications in accordance with the subject innovation, a subscriber can desire that phone calls to the mobile device 104 be routed to the phone 116 (e.g., home phone) when the subscriber is in the coverage area of the CPE 114 (e.g., in or near the home of the subscriber) due to poor cellular service while within the area of the CPE 114 or for another desired reason. The subscriber can create or access the subscriber profile of the subscriber and can specify that phone calls to the mobile device 104 are to be routed to the phone 116 when the mobile device 104 is in the coverage area of the CPE 114. This routing option (e.g., routing parameter indicating a routing preference) can be stored in the subscriber file, which can be stored in the policy database 106. The client component 102 can identify a current location of the mobile device 104, and if the mobile device 104 is in the coverage area associated with the CPE 114, the client component 102 can retrieve the subscriber profile from the policy database 106, and can automatically route a phone call initially directed to the mobile device 104 to the phone 116 based at least in part on the routing information stored in the subscriber profile.

As another routing example, a subscriber can desire that messages (e.g., SMS messages, emails) sent to the mobile device 104 be routed to the computer 120 (e.g., personal computer at home) when the subscriber is in the coverage area of the CPE 114 (e.g., in or near the home of the subscriber) due to poor cellular service while within the area of the CPE 114, or to minimize use of the mobile device 104, or for another desired reason. The subscriber can access the subscriber profile and can select a routing option specifying that messages to the mobile device 104 are to be routed to the computer 120 when the mobile device 104 is in the coverage area of the CPE 114, where this routing option can be saved in the subscriber file, which can be stored in the policy database 106. The client component 102 can identify a current location of the mobile device 104, and if the mobile device 104 is in the coverage area associated with the CPE 114, the client component 102 can retrieve the subscriber profile from the policy database 106, and can automatically route a message(s) initially directed to the mobile device 104 to the computer 120 based at least in part on the information stored in the subscriber profile.

In still another routing example, a subscriber can desire that video content (e.g., movie) sent to the mobile device 104 be routed to the IPTV 118 when the subscriber is in the coverage area of the CPE 114 due to the faster download speed associated with the CPE 114 as compared to the download speed of the mobile device 104 when utilizing the macro base station 122, the user interface of the IPTV 118 being more desirable than the user interface of the mobile device 104, or for another desired reason. The subscriber can access the subscriber profile and can select a routing option specifying that video content directed to the mobile device 104 are to be routed to the IPTV 118 when the mobile device 104 is in the coverage area of the CPE 114, where this routing option can be saved in the subscriber file, which can be stored in the policy database 106. The client component 102 can identify a current location of the mobile device 104, and if the mobile device 104 is in the coverage area associated with the CPE 114, the client component 102 can retrieve the subscriber profile from the policy database 106, and can automatically route video content initially directed to the mobile device 104 to the IPTV 118 based at least in part on the routing option stored in the subscriber profile.

In yet another aspect, the subject innovation can facilitate pushing advertisements to a communication device associated with the CPE 114 when the mobile device 104 is within the coverage area of the CPE 114 (or at other desired times). For example, the client component 102 can determine that the mobile device 104 is located in the coverage area of the CPE 114, and based at least in part on predefined routing criteria (e.g., time of day), the client component 102 can facilitate routing advertisements (e.g., in the form of an SMS message, email, web advertisement, voice mail, etc.) to one or more of the communication devices connected to the CPE 114. For instance, an advertisement for a restaurant can be sent to the computer 120 during a typical time period considered to be a meal time of the subscriber particularly or persons in general.

In accordance with another aspect, there can be multiple associated subscribers (e.g., on a family plan) associated with a subset of communication devices (e.g., phone 116, IPTV 118, computer 120). In an aspect, respective subscriber profiles can be created for each associated subscriber and stored in the policy database 106, where one of those subscriber profiles can be a primary subscriber profile (e.g., parent of other associated subscribers, employer of associated subscribers) and the routing selections contained in the primary subscriber profile can supersede the routing selections in the other subscriber profiles (e.g., secondary subscriber profiles) of associated subscribers and/or routing options that are available to other associated subscribers can be determined based at least in part on the routing selections contained in the primary subscription profile. The client component 102 can facilitate coordinating the available routing options for the primary subscription profile and associated secondary subscription profiles of associated users.

In still another aspect, to facilitate security of communications, the client component 102 can request that a subscriber provide suitable authentication information (e.g., authentication credentials, such as username, password, passcode, personal identification number (PIN), biometric information, etc.) in order to create, access, or modify a subscriber profile of the subscriber. In yet another aspect, the client component 102 can employ digital certificates, private or public encryption keys, and/or other security-related components to facilitate creating a secure tunnel between the network, the gateway component 110, the CPE 114, and/or other associated components, so that the communications can be secured when transmitted to (or received from) the desired communication device connected to the CPE 114. The security protocols employed to secure communications can include, but are not limited to, Internet Protocol Security (IPsec), Secure Socket Layer (SSL), Transport Layer Security (TLS), Secure Shell (SSH), Secure File Transport Protocol (SFTP), or Secure Copy (SCP), for example.

Figure 2:
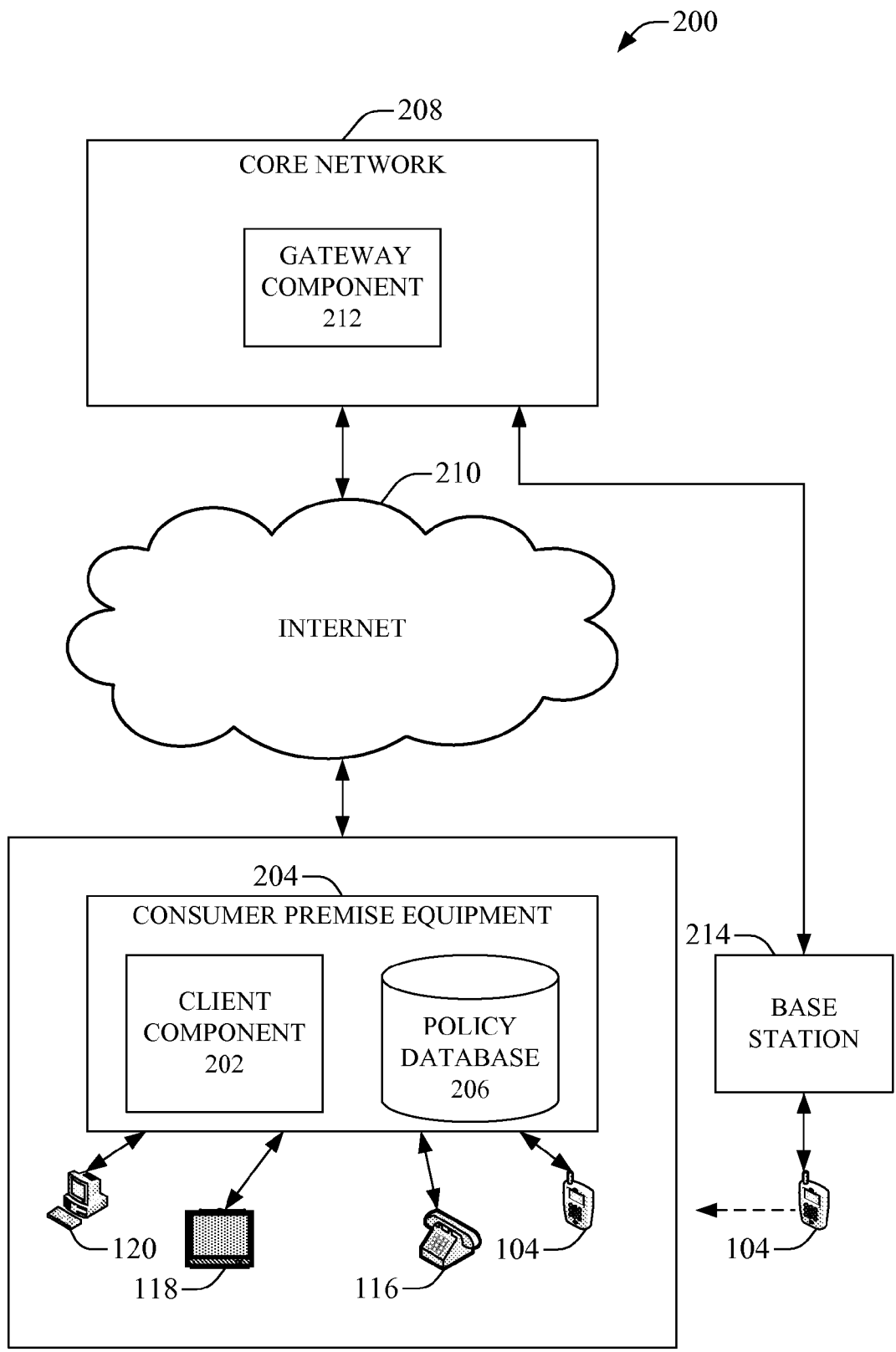
FIG. 2 depicts a diagram of an example system that can facilitate management of routing of voice traffic and/or data traffic to a desired communication device of a plurality of communication devices associated with a subscription in accordance with various aspects and embodiments of the disclosed subject matter.

Referring to FIG. 2, depicted is a diagram of an example system 200 that can facilitate management of routing of voice traffic and/or data traffic to a desired communication device of a plurality of communication devices associated with a subscription in accordance with various aspects and embodiments of the disclosed subject matter. In an aspect, the system 200 can comprise a client component 202 that can be employed to facilitate management of routing of voice and/or data traffic to a desired communication device of a plurality of communication devices associated with a subscription (e.g., subscription to voice services and/or data services, including those associated with a wireless communication network) of a subscriber based at least in part on location of a mobile device 104 (e.g., mobile communication device, such as a cellular phone) associated with the subscriber, a subscriber profile associated with the subscriber, and predefined routing criteria. In contrast to system 100, the client component 202 of system 200 can reside in consumer premise equipment (CPE) 204 associated with a subscriber, where the CPE 204 can be located in a location (e.g., subscriber's home, subscriber's place of employment, or other location), as desired by the subscriber. The client component 204 can be connected to a policy database 206, which can be utilized to store subscriber profiles of respective subscribers. A subscriber can specify priority of routing with regard to the communication devices of the subscriber, where the routing preferences of the subscriber can be stored in the subscriber profile. The client component 202, CPE 204, and policy database 206 can include the same or similar functionality as respective components, such as more fully described herein, for example, with regard to system 100.

The CPE 204 can be connected to a core network 208 via the Internet 210, where a gateway component 212 in the core network 208, can facilitate communicating data (e.g., transmitting data to, receiving data from) to/from the CPE 204 and communication devices associated therewith via the Internet 210. The core network 208 also can be connected with a base station 214, which can be connected (e.g., wirelessly connected) to a mobile device 104 when the mobile device 104 is in the coverage area of the base station 214.

In another aspect, the CPE 204 can comprise a cell (e.g., home base station), such as a femtocell or picocell, and/or a broadband component(s) (e.g., DSL, T1/E1 line, WiMax, Wi-Fi, etc.) that can facilitate wired and/or wireless communication of voice traffic and data traffic between a communication device(s) connected to the CPE 204 and/or other communication devices in the communication environment. In still another aspect, a plurality of communication devices, including a mobile device 104 (e.g., when within the coverage area of the CPE 204), a phone 116, an IPTV 118, and/or a computer 120, and/or other communication devices (e.g., digital video recorder, digital music recorder/player, electronic game, another computer, etc.) (not shown), can be connected (e.g., via a wired connection or wireless connection) to CPE 204.

In accordance with an aspect, when the mobile device 104 of the subscriber is outside (or inside, as desired) the coverage area associated with the CPE 204, the mobile device 104 can be served by a base station 214 (e.g., macro cell) when within the cell coverage area associated with the base station 214 and can facilitate wireless communications associated with the mobile device 104 in the wireless communication environment. In another aspect, then the mobile device 104 is within the coverage area associated with the CPE 204, the client component 202 can facilitate detecting the mobile device 104. In yet another aspect, when the mobile device 104 is detected within the coverage area of the CPE 204, the client component 202 can facilitate automatically routing voice or data traffic (e.g., phone call, short message service (SMS) message, email, downloading of audio or video content, Internet traffic, etc.) directed to the mobile device 104 to a communication device, such as a phone 116, an IPTV 118, or a computer 120 (or the mobile device 104, as desired), based at least in part on the subscriber profile, which can be stored in the policy database 206, and the predefined routing criteria.

In still another aspect, the CPE 204 can comprise a router(s) that can be utilized to route the voice or data traffic to the desired communication device connected to the CPE 204. In yet another aspect, the gateway component 212 and the client component 202 can be configured to facilitate routing voice or data communications in a most desired cost (e.g., least or best cost) and/or most preferred (e.g., subscriber preferred, network preferred) routing manner to facilitate efficient routing of communications. The gateway component 212 can receive information indicating the bearer network of the mobile device 104 and location information regarding the mobile device 104 to facilitate desired routing of a communication initially directed to the mobile device 104. In an aspect, as desired, when routing a voice or data communication, initially directed to the mobile device 104, to a communication device other than the mobile device 104, the client component 202 can transmit a routing message that can be displayed in the user interface of the mobile device 104, where the routing message can indicate that the voice communication or data communication is being routed to a particular communication device (e.g., phone 116, IPTV 118, computer 120).

In another aspect, the client component 202 can facilitate enabling a subscriber to create a subscriber profile, which can contain desired routing preferences of the subscriber, where the subscriber profile can be utilized to facilitate routing of communications directed to the mobile device 104. The subscriber can utilize a communication device (e.g., mobile device 104, computer 120) to access an interface associated with the client component 202 to facilitate creating the subscriber profile. In yet another aspect, the client component 202 can facilitate recommending optimal routing settings, based at least in part on the predefined routing criteria, to the subscriber to facilitate selection of desirable (e.g., optimal) routing of voice or data traffic to communication devices associated with the CPE 204.

In still another aspect, to facilitate security of communications, the client component 202 can request that a subscriber provide suitable authentication information (e.g., authentication credentials) in order to create, access, or modify a subscriber profile of the subscriber. In yet another aspect, the client component 202 and the core network 108 can employ digital certificates, private or public encryption keys, and/or other security-related components to facilitate creating a secure tunnel between the network, the gateway component 110, the CPE 204, and/or other associated components, so that the communications can be secured when transmitted to (or received from) the desired communication device connected to the CPE 204. The security protocols employed to secure communications can include, but are not limited to, IPsec, SSL, TLS, SSH, SFTP, or SCP, for example.

Figure 3:
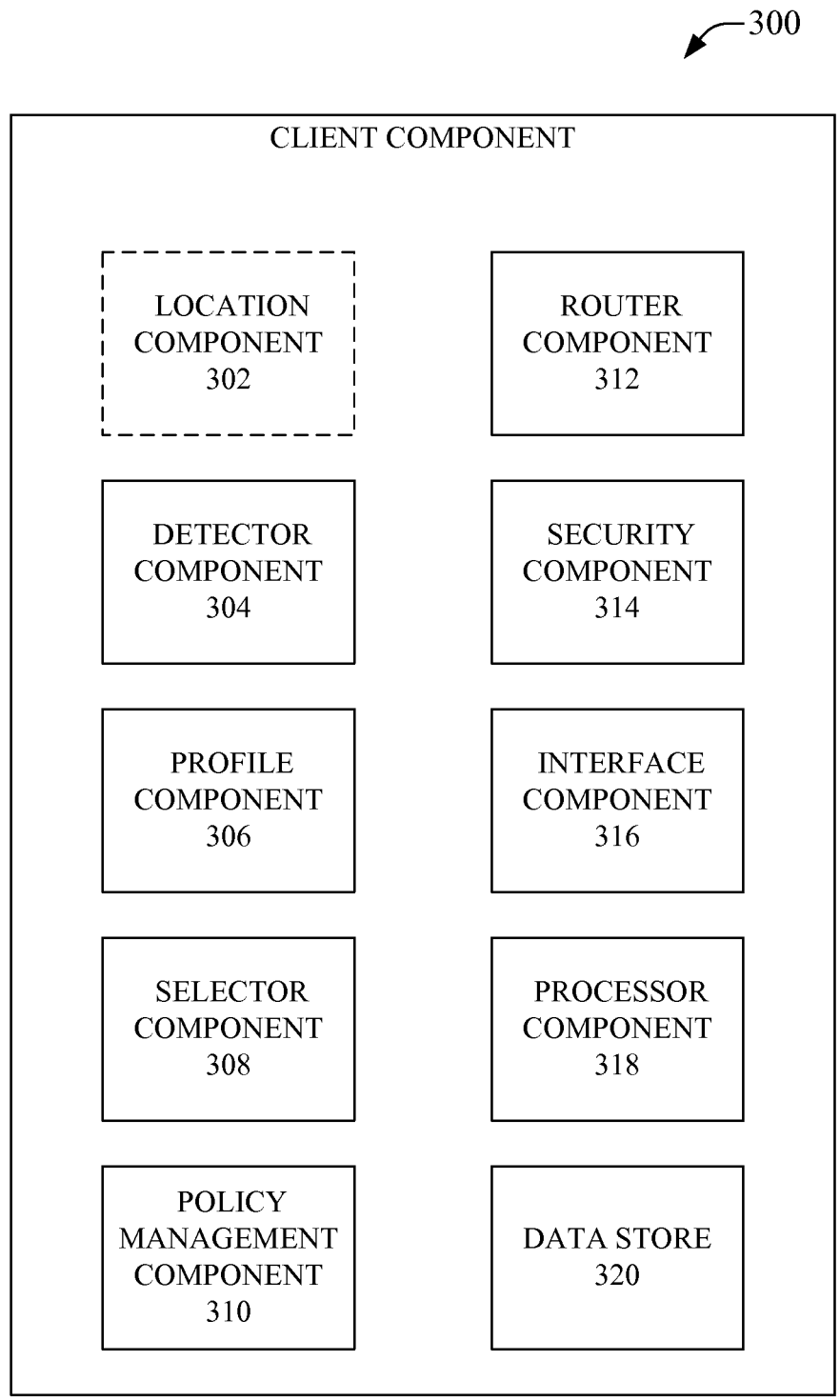
FIG. 3 illustrates a block diagram of an example client component that can facilitate management of routing of voice or data communications in accordance with an aspect of the disclosed subject matter.

FIG. 3 illustrates a block diagram of an example client component 300 that can facilitate management of routing of voice or data communications in accordance with an aspect of the disclosed subject matter. In accordance with an embodiment, the client component 300 can include a locator component 302 that can facilitate identifying a location of a mobile device 104 to facilitate determining whether the mobile device 104 is within a coverage area associated with a CPE (e.g., CPE 114) in order to facilitate routing of communications directed to the mobile device 104 to a desired communication device associated with the CPE. The locator component 302 can be included in the client component 300 when the client component 300 resides in the core network (e.g., 108), for example. In an aspect, the locator component 302 can employ an LBS to facilitate determining the geographic location of the mobile device 104.

In accordance with another embodiment, the client component 300 can include a detector component 304 that can facilitate detecting when the mobile device 104 is within a coverage area associated with a CPE (e.g., CPE 204). The detector component 304 can detect the mobile device to facilitate connecting the mobile device 104 to the CPE and/or to facilitate routing of voice or data traffic initially sent to the mobile device 104 to a desired communication device connected to the CPE based at least in part on the predefined routing criteria.

In an aspect, the client component 300 also can comprise a profile component 306 that can be utilized to facilitate generating subscriber profiles for respective subscribers. The profile component 306 can facilitate providing available routing options to a subscriber and/or recommending preferred (e.g., optimal) routing options to a subscriber to facilitate generating a subscriber profile. A selector component 308 can be employed with the profile component 306 to facilitate selection of desired routing options to be included in the subscriber profile. In an aspect, the preferred routing options can be routing options that can facilitate providing a desired (e.g., least) cost (e.g., lowest price, fastest download time, etc.) and/or more desirable reception of the communication (e.g., displaying video on IPTV 118 as opposed to the mobile device 104).

In yet another aspect, the client component 300 can contain a policy management component 310 that can facilitate routing voice or data traffic initially directed to the mobile device 104 of a subscriber in accordance with the routing options contained in the subscriber profile when the mobile device 104 is within the coverage area of the CPE of the subscriber. The policy management component 310 can facilitate accessing the subscriber profile, which can be stored in a policy database (e.g., 106, 206; not shown in FIG. 3), and can retrieve the routing options, or at least a portion thereof, from the subscriber profile, and can utilize the routing options to facilitate determining to which communication device connected to the CPE the voice or data traffic is to be routed. In still another aspect, the client component 300 can comprise a router component 312 that can facilitate routing voice or data traffic to a desired communication device in accordance with the determination regarding routing of the communication made by the policy management component 310.

In an aspect, the client component 300 can include a security component 314 that can be employed to facilitate securing creation, access, and/or modification of subscriber profiles and providing a secure tunnel for voice and data communications between the core network (e.g., 108, 208) and the communication devices (e.g., mobile device 104, phone 116, IPTV 118, computer 120, etc.) associated with the CPE (e.g., 114, 204). The security component 314 can request authentication credentials (e.g., password, PIN, etc.) from a subscriber to facilitate authenticating the subscriber to create, access, and/or modify a subscriber profile of the subscriber. In another aspect, the security component 314 can employ a desired security-related protocol(s) (e.g., IPsec, SSL, etc.), digital certificates, and/or private or public keys, to facilitate establishing a secure tunnel between the core network, gateway component, routers, client component, CPE, and/or other components to facilitate secure of voice or data communications to/from the communication devices connected to the CPE associated with the subscriber.

In another aspect, the client component 300 can facilitate managing interaction with an end user (e.g., subscriber) via interface component 316. Information generated through such interaction can be conveyed to, and utilized by, the client component 300. In an aspect of the subject innovation, the interface component 316 can provide display and/or receive information that can facilitate generating, accessing, or modifying a subscriber profile. For example, when a subscriber profile is being created or modified, the interface component 316 can display information (e.g., icons representing available communication devices) that can indicate which communication devices are available with regard to a potential routing option(s) (e.g., routing of voice traffic, routing of messages, routing of video or audio content, etc.) to facilitate automatically routing traffic initially directed to a mobile device 104 to a desired communication device. The subscriber can select a desired communication device for a specified type of communication via the interface component 316 and the subscriber profile can be updated to include the selected communication device as the desired device to route the communication to when the mobile device 104 is connected to the CPE.

In yet another aspect, the client component 300 can comprise a processor component 318 that can be associated with other components of the client component 300, and can facilitate processing data, performing operations (e.g., routing operations, determinations regarding routing of communications, etc.), and/or controlling data flow associated with the client component 300. The processor component 318 can include a processor(s), microprocessor(s), and/or a controller(s), for example.

The client component 300 also can contain a data store 320 that can be utilized to store information and/or code, which can facilitate operation of the client component 300, where the information and/or code can comprise, for example, information and/or code that can facilitate enabling the client component 300 to route communications directed to a mobile device 104 to a desired communication device connected to a CPE when the mobile device is within the coverage area of the CPE; information and/or code that can facilitate accessing, creating, or modifying a subscriber profile; information and/or code that can facilitate securing communications between the core network and the CPE; information and/or code that can facilitate securing subscriber profiles; etc. The data store 320 can comprise volatile memory and/or nonvolatile memory. By way of illustration, and not limitation, nonvolatile memory can include read only memory (ROM), programmable ROM (PROM), electrically programmable ROM (EPROM), electrically erasable PROM (EEPROM), flash memory, and/or nonvolatile random access memory (NVRAM). Volatile memory can include random access memory (RAM), which can act as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The data store 320 is intended to comprise, without being limited to, these and any other suitable types of memory.

Figure 4:
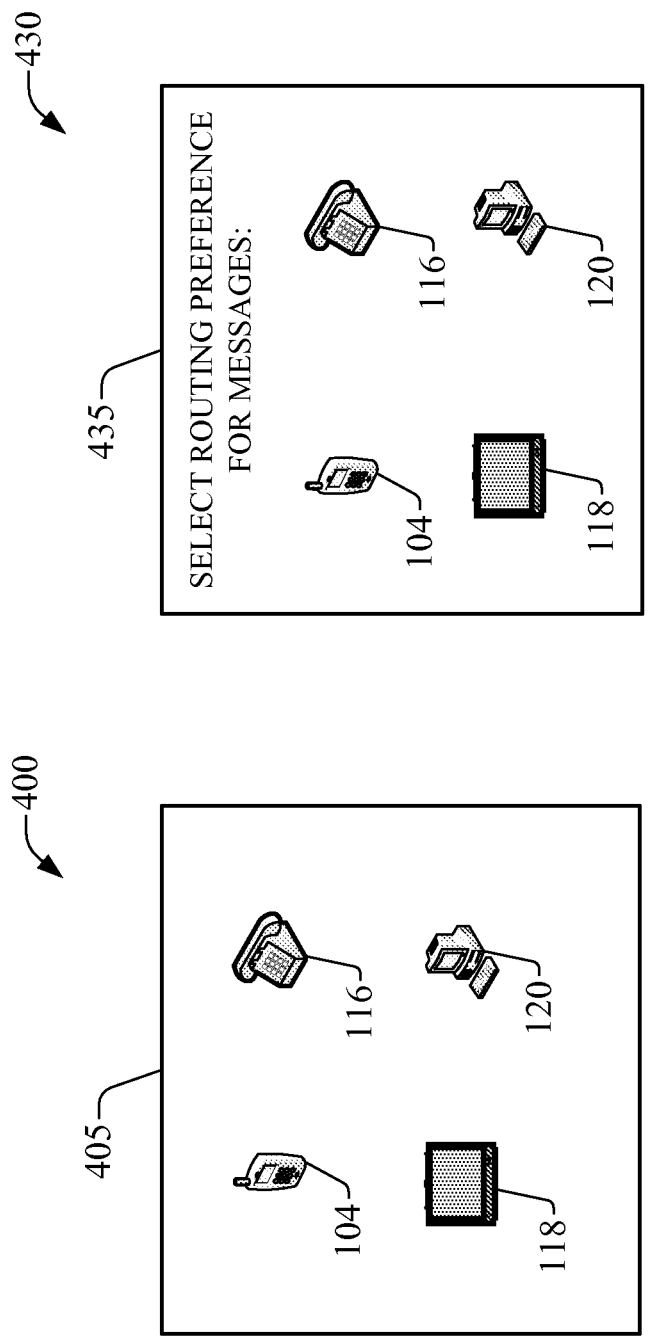
FIGS. 4A and 4B illustrate diagrams of example display user interfaces (DUIs) that can facilitate management of routing of voice or data traffic associated with a mobile device in accordance with various aspects described herein.

FIGS. 4A and 4B illustrate diagrams of example display user interfaces (DUIs) that can facilitate management of routing of voice or data traffic associated with a mobile device in accordance with various aspects described herein. A DUI can be part of interface component 316, and aspects or features of a DUI generally can be dictated by operational resources available to interface component 316 in a device (e.g., mobile device 104, IPTV 118, computer 120). For example, a DUI can be embodied in a display area in a monitor (e.g., a cathode ray tube (CRT) monitor, a Liquid Crystal Display (LCD) monitor, a plasma monitor, an electrochromic monitor, etc.) that can render video image(s) from IPTV stream(s) delivered through an IPTV interface, or images from a personal computer, mobile computer, a mobile station, etc. FIG. 4A illustrates diagram 400 of a DUI that can include a rendering area 405 that can display communication devices, such as phone 116, IPTV 118, computer 120, and mobile device 104, that are available for routing a particular type of communication when the mobile device is within the coverage area of the CPE (e.g., 114, 204). It is to be appreciated that the communication devices provided in FIG. 4A are only an example of communication devices that can be employed for routing communications, and, in accordance with the subject innovation, the DUI can display more communication devices or less communication devices, or disparate communication devices than the devices displayed, depending in part on the communication devices connected to the CPE, the type of communication for which routing is desired, etc.

FIG. 4B illustrates diagram 430 of an example DUI that can include a rendering area 435 that can display an example routing option related to messages directed to a mobile device 104 when the mobile device 104 of a subscriber is within a coverage area of a CPE of the subscriber. The subscriber can select (e.g., using a mouse, touching the screen, etc.) a desired communication device from the communication devices (e.g., phone 116, IPTV 118, computer 120, mobile device 104) displayed in the rendering area 435 to facilitate routing messages initially directed to the mobile device 104 to the selected communication device when the mobile device 104 is within the coverage area of the CPE. It is to be appreciated and understood that the example routing option related to messages is only one example of routing options that can be employed in accordance with the subject innovation, and the other routing options (e.g., routing of phone calls, routing of audio or video content, etc.) are intended to be encompassed by the subject innovation.

Figure 5:
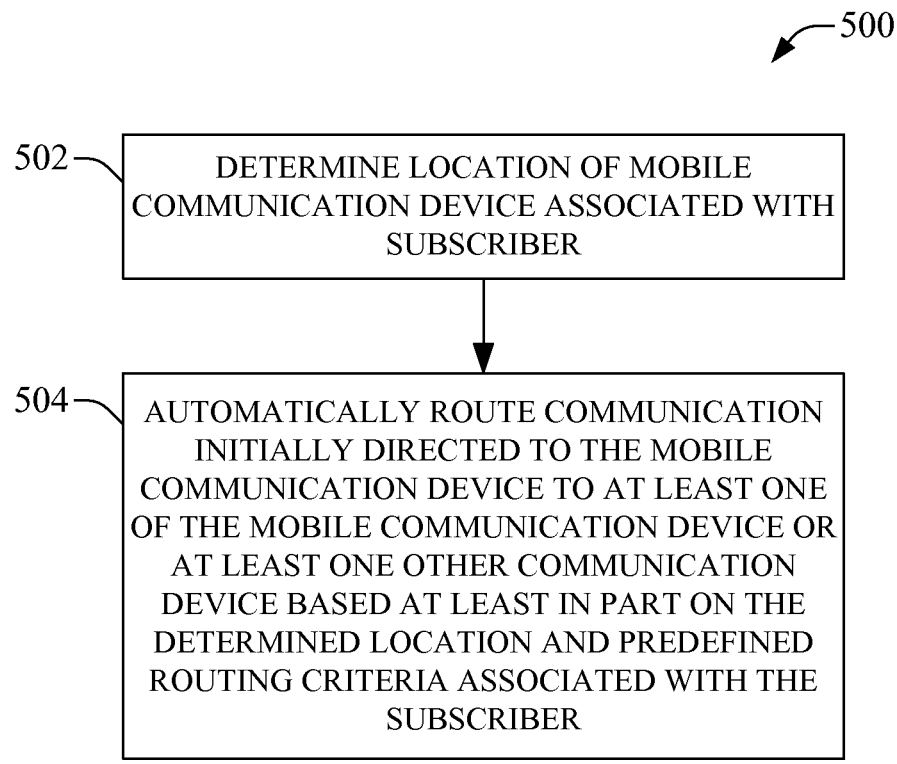
FIG. 5 depicts a flowchart of an example methodology that can facilitate routing voice or data communications associated with a mobile device in accordance with various aspects described herein.
Figure 6:
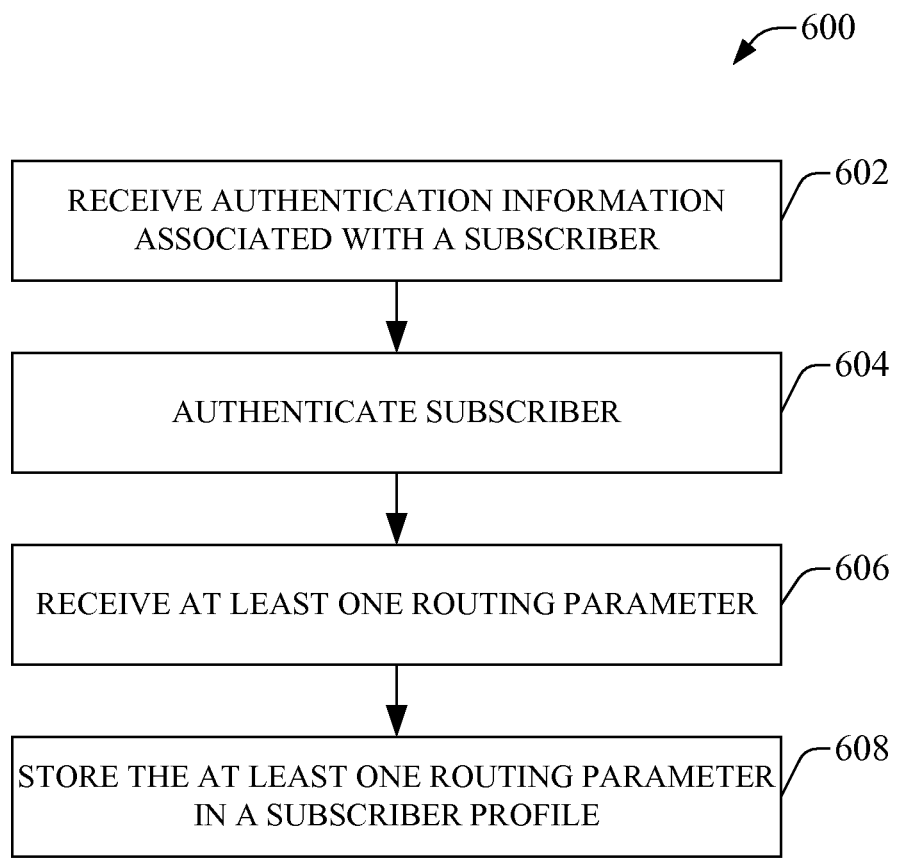
FIG. 6 is a flowchart of an example methodology that can create or modify a subscriber profile of a subscriber to facilitate routing communications associated with a mobile device of the subscriber in accordance with various aspects of the disclosed subject matter.
Figure 7:
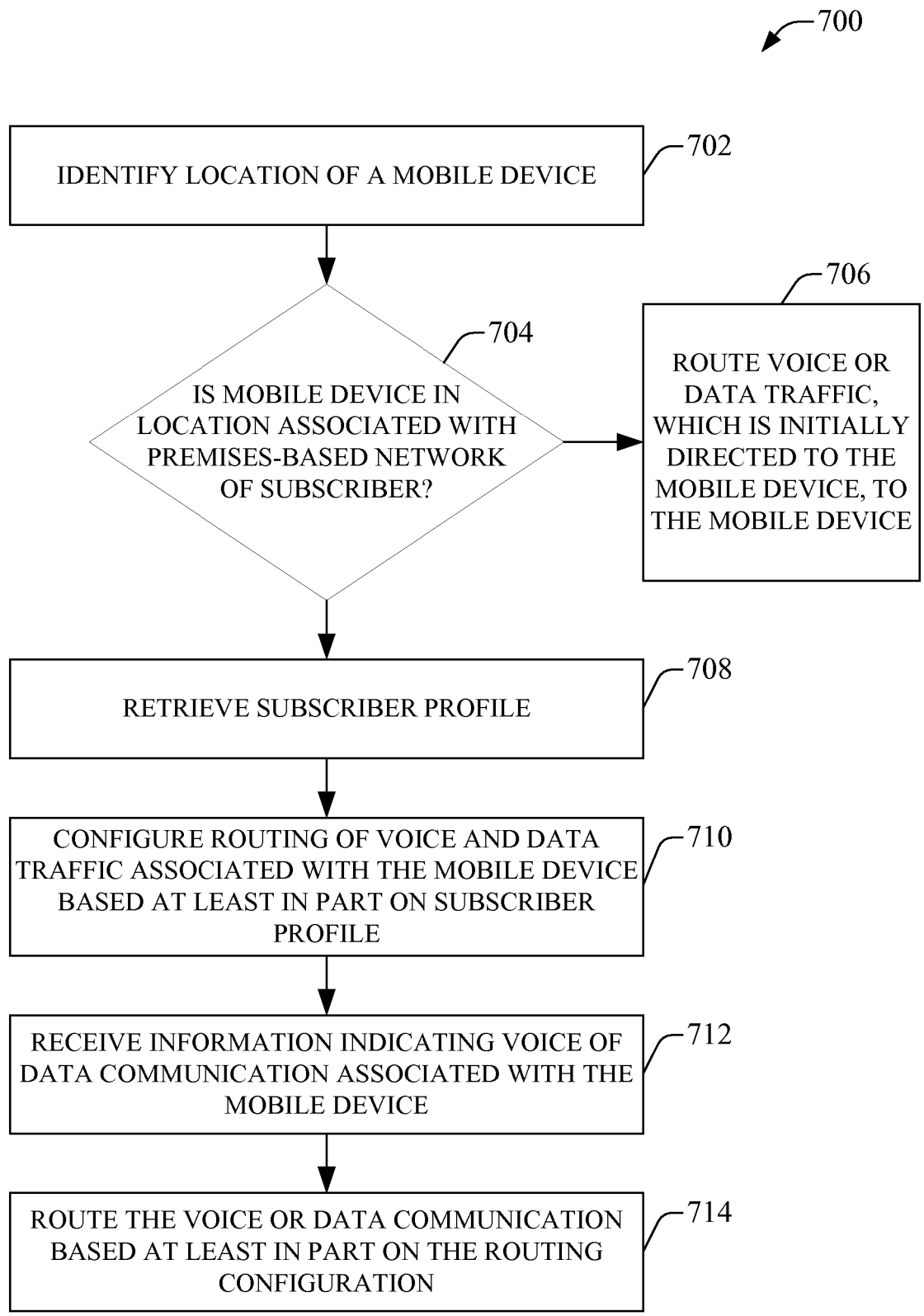
FIG. 7 illustrates a flowchart of an example methodology that can facilitate managing routing of voice or data communications associated with a mobile device in accordance with various aspects of the disclosed subject matter.

In view of the example systems described above, example methodologies that can be implemented in accordance with the disclosed subject matter can be better appreciated with reference to flowcharts in FIGS. 5-7. For purposes of simplicity of explanation example methodologies, or methods, are presented and described as a series of acts; however, it is to be understood and appreciated that the disclosed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram, or interaction diagram. Moreover, not all illustrated acts may be required to implement a methodology in accordance with the subject specification. Additionally, it should be further appreciated that the methodologies disclosed hereinafter and throughout this specification are capable of being stored on an article of manufacture to facilitate transporting and transferring such methodologies to computers for execution by a processor or for storage in a memory.

FIG. 5 is a flowchart of an example methodology 500 that can facilitate routing voice or data communications associated with a mobile device in accordance with various aspects described herein. At 502, a location of the mobile device (e.g., mobile device 104, such as a cellular phone) associated with a subscriber can be determined. In an aspect, a client component (e.g., 102, 202) can facilitate detecting the mobile device 104 and/or identifying a location of the mobile device 104 to facilitate determining whether the mobile device 104 is within a coverage area associated with a CPE (e.g., 114, 204) associated with the subscriber.

At 504, a voice or data communication, initially directed to the mobile device, can be routed to a specified communication device associated with the CPE based at least in part on the determined location of the mobile device and a routing preference(s) contained in a subscriber profile of the subscriber. In an aspect, the voice or data communication, which initially is being sent to the mobile device 104, can be routed to a specified communication device (e.g., phone 116, IPTV 118, computer 120, mobile device 104, . . . ) connected to the CPE associated with the subscriber when the mobile device 104 is determined to be within the coverage area of the CPE of the subscriber in accordance with the routing preference(s) for the particular type of communication (e.g., phone call, SMS message, email, audio content, video content, . . . ), as provided in the subscriber profile.

FIG. 6 is a flowchart of an example methodology 600 that can create or modify a subscriber profile of a subscriber to facilitate routing communications associated with a mobile device of the subscriber in accordance with various aspects of the disclosed subject matter. At 602, authentication information (e.g., authentication credentials) can be received. In an aspect, a client component (e.g., 102, 202) can receive authentication information from a subscriber to facilitate authenticating the subscriber so that the subscriber can access, create, or modify a subscriber profile of the subscriber. At 604, the subscriber can be authenticated to grant the subscriber access to the subscriber profile (or grant access to create a subscriber profile) based at least in part on valid authentication credentials obtained from the subscriber. The client component can facilitate granting access to the subscriber so the subscriber can create or modify a subscriber profile, if the client component receives valid authentication credentials from the subscriber. In an aspect, if the received authentication information is not valid, the client component can deny the subscriber access to create or modify a subscriber profile, and/or can prompt the subscriber to provide valid authentication credentials.

At 606, at least one routing parameter can be received. In an aspect, the subscriber can select at least one routing parameter related to a type of communication to facilitate routing communications of that type to a desired communication device, which is connected to the CPE associated with the subscriber. The client component can receive the routing parameter(s) from the subscriber. For example, a subscriber can be prompted by the client component to select a communication device, such as an IPTV 118, computer 120, or mobile device 104, associated with the CPE, to which video content is to be routed when video content is being sent to the mobile device 104 while the mobile device 104 is within the coverage area of the CPE of the subscriber. The subscriber can select the desired communication device, and the routing parameter can indicate the selected communication device. The client component can receive the routing parameter indicating the desired communication device to which video content is to be routed when the mobile device 104 is within the coverage area of the CPE.

At 608, the at least one routing parameter can be stored in the subscriber profile associated with the subscriber. In an aspect, the client component can facilitate storing the received routing parameter(s) in the subscriber profile of the subscriber, where the subscriber profile can be stored in a policy database (e.g., 106, 206) associated with the client component. When the mobile device 104 is within the coverage area of the CPE of the subscriber, the client component can access the subscriber profile to facilitate determining the routing of voice or data communications initially directed to the mobile device 104, based at least in part on the routing parameter(s) stored in the subscriber profile. When a voice or data communication is being sent to the mobile device 104, the client component can facilitate routing the communication to the desired communication device, which is connected to the CPE, based at least in part on the routing parameter(s) in the subscriber profile.

FIG. 7 is a flowchart of an example methodology 700 that can facilitate managing routing of voice or data communications associated with a mobile device in accordance with various aspects of the disclosed subject matter. At 702, the location (e.g., geographic location) of a mobile device can be identified. In an aspect, a client component (e.g., 102) can employ LBS to identify a location of a mobile device 104, if the client component resides in the core network (e.g., 108); or a client component (e.g., 202), if residing in the CPE, can detect a mobile device 104 that has entered the coverage area of a CPE of a subscriber to facilitate identifying the location of the mobile device 104. At 704, a determination can be made regarding whether the mobile device is located within a coverage area associated with the CPE associated with the subscriber. In an aspect, the client component can facilitate determining whether the mobile device 104 is located within the coverage areas associated with the CPE, associated with the subscriber, based at least in part on the identified location of the mobile device 104.

If it is determined that the location of the mobile device is not within the coverage area associated with the CPE, at 706, a voice or data communication, which is initially directed to the mobile device, can be routed to the mobile device. The client component can determine that communications can be routed to the mobile device 104 when the mobile device is not within the coverage area associated with the CPE associated with the subscriber.

If, at 704, it is determined that the mobile device is located within the coverage area associated with the CPE, at 708, a subscriber profile associated with the subscriber can be retrieved. In one aspect, the client component can retrieve the subscriber profile of the subscriber from a policy database (e.g., 106, 206) associated with the client component. The subscriber profile can comprise information related to the routing preferences of the subscriber for voice or data communications directed to the mobile device when the mobile device is within the coverage area of the CPE.

At 710, routing of voice and/or data communications can be configured based at least in part on the routing preferences contained in the subscriber profile. In one aspect, the client component can facilitate configuring routers and/or other components to facilitate routing a voice or data communication, which is initially directed to the mobile device 104 of the subscriber, to a desired communication device connected to the CPE associated with the subscriber.

At 712, information can be received, where the received information can indicate that a voice or data communication is being directed to (e.g., transmitted to) the mobile device. In an aspect, the client component can receive information indicating that a voice or data communication is being sent to the mobile device 104. At 714, the voice or data communication, which is initially directed to the mobile device, can be automatically routed to a specified communication device based at least in part on the routing configuration, which can be based at least in part on the routing preferences contained in the subscriber profile of the subscriber. In accordance with one aspect, the client component can facilitate routing the voice or data communication, which is initially being sent to the mobile device 104, to the specified communication device (e.g., computer 120, IPTV 118, phone 116, . . . ), which is connected to the CPE of the subscriber, based at least in part on the routing configuration.

It is to be appreciated and understood that, in accordance with methodology 700, as desired, the routing configuration (e.g., as described at reference numeral 710) can be performed at the time the mobile device 104 is determined to be located within the coverage area associated with the CPE, or, even though the mobile device 104 is determined to be located within the coverage area associated with the CPE, the routing configuration can be performed at a time when a voice or data communication is being sent to the mobile device 104. Thus, for example, as desired, the routing configuration can be performed after information is received indicating that a voice or data communication is being directed to the mobile device (e.g., as described with regard to reference numeral 712).

Figure 8:
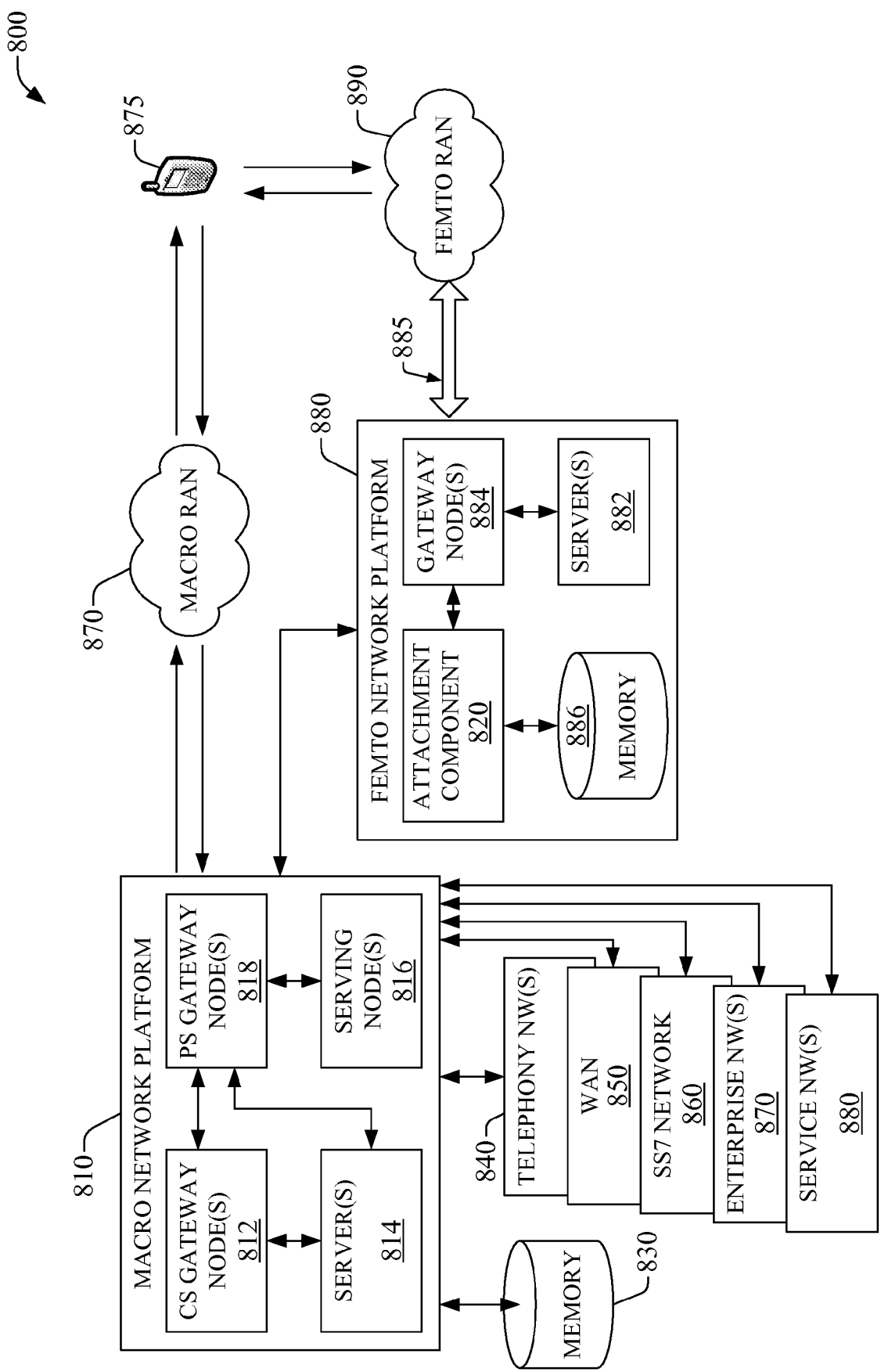
FIG. 8 depicts a block diagram of example macro and femto wireless network environments that can exploit femto access points in accordance with various aspects of the disclosed subject matter.
Figure 9:
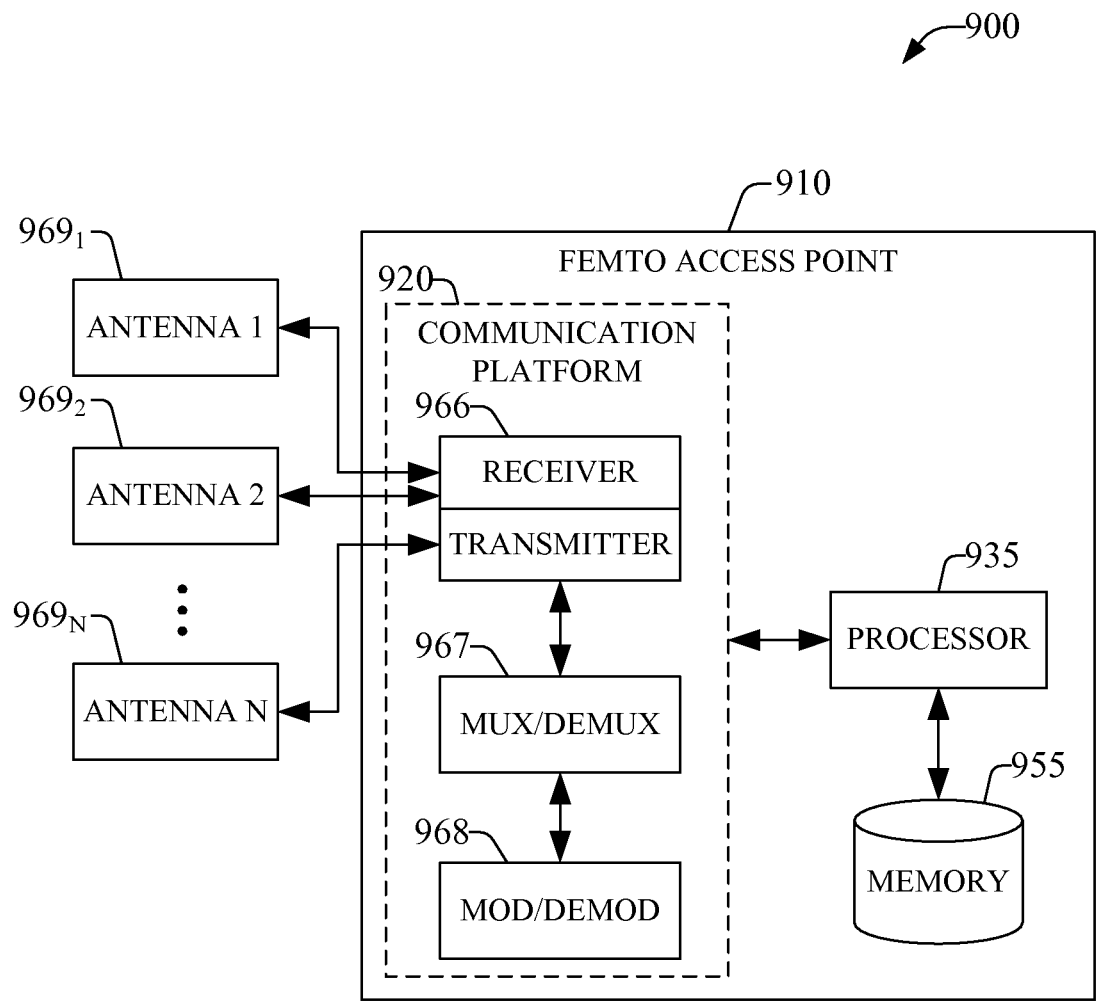
FIG. 9 is a block diagram of an example femto access point that operates in accordance with aspects disclosed in the subject specification.

To provide further context for various aspects of the subject specification, FIG. 8 and FIG. 9 illustrate, respectively, example macro and femto wireless network environments that can exploit femtocells (e.g., femto access points (APs)) and a block diagram of an example embodiment of a femtocell access point that can enable and exploit features or aspects of the subject innovation and that utilize aspects of the subject innovation in accordance with various aspects of the subject specification.

With respect to FIG. 8, wireless communication environment 800 includes two wireless network platforms: (i) A macro network platform 810 which serves, or facilitates communication with user equipment 875 (e.g., mobile device 104) via a macro radio access network (RAN) 870. It should be appreciated that in cellular wireless technologies (e.g., 3GPP UMTS, HSPA, 3GPP LTE, 3GPP2 UMB), macro network platform 810 is embodied in a Core Network (e.g., 108, 208). (ii) A femto network platform 880, which can provide communication with UE 875 through a femto RAN 890, which is linked to the femto network platform 880 via backhaul pipe(s) 885 (e.g., backhaul link(s)). It should be appreciated that macro network platform 810 typically hands off UE 875 to femto network platform 810 once UE 875 attaches (e.g., through macro-to-femto handover) to femto RAN 890, which includes a set of deployed femto APs (e.g., femtocell included in CPE 114 or CPE 204) that can operate in accordance with aspects described herein.

It is noted that RAN includes base station(s), or access point(s), and its associated electronic circuitry and deployment site(s), in addition to a wireless radio link operated in accordance with the base station(s). Accordingly, macro RAN 870 can comprise various coverage cells like cell 105, while femto RAN 890 can comprise multiple femtocell access points (e.g., femtocell included in CPE 114 or CPE 204). Deployment density in femto RAN 890 can be substantially higher than in macro RAN 870.

Generally, both macro and femto network platforms 810 and 880 include components, e.g., nodes, gateways, interfaces, servers, or platforms, that facilitate both packet-switched (PS) (e.g., internet protocol (IP), frame relay, asynchronous transfer mode (ATM)) and circuit-switched (CS) traffic (e.g., voice and data) and control generation for networked wireless communication. In an aspect of the subject innovation, macro network platform 810 includes CS gateway node(s) 812 which can interface CS traffic received from legacy networks like telephony network(s) 840 (e.g., public switched telephone network (PSTN), or public land mobile network (PLMN)) or a SS7 network 860. CS gateway 812 can authorize and authenticate traffic (e.g., voice) arising from such networks. Additionally, CS gateway 812 can access mobility, or roaming, data generated through SS7 network 860; for instance, mobility data stored in a VLR, which can reside in memory 830. Moreover, CS gateway node(s) 812 interfaces CS-based traffic and signaling and gateway node(s) 818. As an example, in a 3GPP UMTS network, PS gateway node(s) 818 can be embodied in gateway GPRS support node(s) (GGSN).

In addition to receiving and processing CS-switched traffic and signaling, PS gateway node(s) 818 can authorize and authenticate PS-based data sessions with served (e.g., through macro RAN) wireless devices. Data sessions can include traffic exchange with networks external to the macro network platform 810, like wide area network(s) (WANs) 850, enterprise networks (NW(s)) 870 (e.g., enhanced 911), or service NW(s) 880 like IP multimedia subsystem (IMS); it should be appreciated that local area network(s) (LANs), which may be a part of enterprise NW(s), can also be interfaced with macro network platform 810 through PS gateway node(s) 818. Packet-switched gateway node(s) 818 generates packet data contexts when a data session is established. To that end, in an aspect, PS gateway node(s) 818 can include a tunnel interface (e.g., tunnel termination gateway (TTG) in 3GPP UMTS network(s); not shown) which can facilitate packetized communication with disparate wireless network(s), such as Wi-Fi networks, for example. It should be further appreciated that the packetized communication can include multiple flows that can be generated through server(s) 814. It is to be noted that in 3GPP UMTS network(s), gateway node(s) 818 (e.g., GGSN) and tunnel interface (e.g., TTG) comprise a packet data gateway (PDG).

Macro network platform 810 also includes serving node(s) 816 that convey the various packetized flows of information, or data streams, received through PS gateway node(s) 818. As an example, in a 3GPP UMTS network, serving node(s) can be embodied in serving GPRS support node(s) (SGSN).

As indicated above, server(s) 814 in macro network platform 810 can execute numerous applications (e.g., location services, online gaming, wireless banking, wireless device management, . . . ) that generate multiple disparate packetized data streams or flows, and manage (e.g., schedule, queue, format . . . ) such flows. Such application(s), for example can include add-on features to standard services provided by macro network platform 810. Data streams can be conveyed to PS gateway node(s) 818 for authorization/authentication and initiation of a data session, and to serving node(s) 816 for communication thereafter. Server(s) 814 can also effect security (e.g., implement one or more firewalls) of macro network platform 810 to ensure network's operation and data integrity in addition to authorization and authentication procedures that CS gateway node(s) 812 and PS gateway node(s) 818 can enact. Moreover, server(s) 814 can provision services from external network(s), e.g., WAN 850, or Global Positioning System (GPS) network(s), which can be a part of enterprise NW(s) 880. It is to be noted that server(s) 814 can include one or more processors that can be configured to confer at least in part the functionality of macro network platform 810. To that end, the one or more processors can execute code instructions stored in memory 830, for example.

In example wireless environment 800, memory 830 stores information related to operation of macro network platform 810. Information can include data associated with subscribers; operational data for mobile devices served through macro network platform; service and privacy policies; and so forth. Memory 830 can also store information from at least one of telephony network(s) 840, WAN 850, SS7 network 860, enterprise NW(s) 870, or service NW(s) 880.

Regarding femto network platform 880, it includes a femto gateway node(s) 884, which have substantially the same functionality as PS gateway node(s) 818. Additionally, femto gateway node(s) 884 can also include substantially all functionality of serving node(s) 816. Disparate gateway node(s) 884 can control or operate disparate sets of deployed femto APs, which can be a part of femto RAN 890. In an aspect of the subject innovation, femto gateway node(s) 884 can aggregate operational data received from deployed femto APs. Moreover, femto gateway node(s) 884, can convey received attachment signaling to attachment component 820. It should be appreciated that while attachment component is illustrated as external to gateway node(s) 884, attachment component 820 can be an integral part of gateway node(s) 884. In another aspect, the attachment component 820 can facilitate macro-to-femto and femto-to-macro handover with attachment to a femto AP dictated in accordance predefined criteria.

Memory 886 can retain additional information relevant to operation of the various components of femto network platform 880. For example operational information that can be stored in memory 886 can comprise, but is not limited to, subscriber intelligence; contracted services; maintenance and service records; femto cell configuration (e.g., devices served through femto RAN 890; authorized subscribers associated with one or more deployed femto APs); service policies and specifications; privacy policies; add-on features; so forth.

Server(s) 882 have substantially the same functionality as described in connection with server(s) 814. In an aspect, server(s) 882 can execute multiple application(s) that provide service (e.g., voice and data) to wireless devices served through femto RAN 890. Server(s) 882 can also provide security features to femto network platform 880. In addition, server(s) 882 can manage (e.g., schedule, queue, format . . . ) substantially all packetized flows (e.g., IP-based, frame relay-based, ATM-based) it generates in addition to data received from macro network platform 810. Furthermore, server(s) 882 can effect provisioning of femtocell service, and effect operations and maintenance. It is to be noted that server(s) 882 can include one or more processors configured to provide at least in part the functionality of femto network platform 880. To that end, the one or more processors can execute code instructions stored in memory 886, for example.

With respect to FIG. 9, in embodiment 900, femto AP 910 can receive and transmit signal(s) from and to wireless devices like macro and femto access points, access terminals, wireless ports and routers, and the like, through a set of antennas $969_1$-$969_N$. It should be appreciated that while antennas $969_1$-$969_N$ are a part of communication platform 920, which comprises electronic components and associated circuitry that provides for processing and manipulation of received signal(s) and signal(s) to be transmitted. In an aspect, communication platform 920 includes a receiver/transmitter 966 that can convert signal from analog to digital upon reception, and from digital to analog upon transmission. In addition, receiver/transmitter 966 can divide a single data stream into multiple, parallel data streams, or perform the reciprocal operation. Coupled to receiver/transmitter 966 is a multiplexer/demultiplexer 967 that facilitates manipulation of signal in time and frequency space. Electronic component 967 can multiplex information (e.g., data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 967 can scramble and spread information (e.g., codes) according to substantially any code known in the art; e.g., Hadamard-Walsh codes, Baker codes, Kasami codes, polyphase codes, and so on. A modulator/demodulator 968 is also a part of operational group 925, and can modulate information according to multiple modulation techniques, such as frequency modulation, amplitude modulation (e.g., M-ary quadrature amplitude modulation (QAM), with M a positive integer), phase-shift keying (PSK), and the like.

Femto access point 910 also includes a processor 935 that can be configured to confer functionality, at least partially, to substantially any electronic component in the femto access point 910. In addition, processor 935 can facilitate operations on data (e.g., symbols, bits, or chips) for multiplexing/demultiplexing, such as effecting direct and inverse fast Fourier transforms, selection of modulation rates, selection of data packet formats, inter-packet times, etc. A memory 955 can store data structures, code instructions, system or device information like policies and specifications, code sequences for scrambling, spreading and pilot transmission, floor plan configuration, access point deployment and frequency plans, scheduling policies, and so on. In embodiment 900, processor 935 can be coupled to the memory 955 in order to store and retrieve information necessary to operate and/or confer functionality to communication platform 920 and other operational aspects of femto access point 910. In accordance with an embodiment, the femto access point 910 can be associated (e.g., connected) with a client component (e.g., client component 202) to facilitate routing of voice or data communications associated with a mobile device 104.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Various aspects or features described herein may be implemented as a method, apparatus, or article of manufacture using standard programming and/or engineering techniques. In particular, the aspects or features can be implemented through program modules stored in a memory and executed by a processor, and/or other combination of hardware and software, e.g., firmware. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," and substantially any other information storage component relevant to operation and functionality of a component, refer to "memory components," or entities embodied in a "memory" or components comprising the memory. For example, information relevant to operation of various components described in the disclosed subject matter, and that can be stored in a memory, can comprise provisioning information; security credentials and algorithms; files and applications; policies such as alarm(s) criteria and alarm reports; and so forth. It is to be appreciated that the memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable PROM (EEPROM), flash memory, and/or nonvolatile random access memory (NVRAM). Volatile memory can include random access memory (RAM), which can act as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of systems and methods that provide advantages of the subject innovation. It is, of course, not possible to describe every conceivable combination of components or methodologies for purposes of describing the subject innovation, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A femto access point device, comprising:
    a memory to store executable instructions; and
    a processor, coupled to the memory, that facilitates execution of the executable instructions to perform operations, comprising:
        facilitating a display of recommendation data indicative of a set of communication devices that are coupled to the femto access point device, wherein the set of communication devices is selected based on availability data associated with respective resources associated with the set of communication devices,
        as a function of the facilitating, receiving input data that updates subscriber profile data associated with the set of communication devices, wherein the subscriber profile data is indicative of a set of routing policies and the input data selects a first communication device of the set of communication devices, to which communication data that is directed to a second communication device of the communication devices is to be routed,
        in response to receiving the communication data via a macro network device and determining that the second device is coupled to the femto access point device, facilitating, based on the subscriber profile data, a routing of the communication data to the first device via the femto access point device, wherein identifier data indicative of the first device is transmitted to the second device via the femto access point device.

2. The femto access point device of claim 1, wherein the set of routing policies specify communication routes assigned to respective types of communication data received from the macro network device.

3. The femto access point device of claim 1, wherein the facilitating the routing comprises facilitating the routing in response to determining that cost data indicative of a cost of directing the communication to the first device satisfies a defined cost criterion.

4. The femto access point device of claim 1, wherein the facilitating the routing comprises facilitating the routing in response to determining that timing data indicative of a time period during which the communication is received satisfies a defined timing criterion.

5. The femto access point device of claim 1, wherein the receiving the input data comprises receiving the input data via a secure tunnel that is established based on digital certificate data.

6. The femto access point device of claim 1, wherein the set of communication devices is selected based on respective functionality data associated with the set of communication devices.

7. The femto access point device of claim 1, wherein the communication data comprises advertisement data.

8. The femto access point device of claim 1, wherein the operations further comprise:
    granting access to the subscriber profile data based on reception of valid authentication credential data.

9. The femto access point device of claim 1, wherein the receiving the input data comprises receiving the input data by employing a secure communication protocol.

10. The femto access point device of claim 6, wherein the respective functionality data is indicative of respective download speeds associated with the set of communication devices.

11. The femto access point device of claim 6, wherein the respective functionality data is indicative of respective presentation interface characteristics associated with the set of communication devices.

12. The femto access point device of claim 1, wherein the routing comprises facilitating the routing in response to determining that location data indicative of a location of the second device satisfies a defined location criterion.

13. A method, comprising:
    facilitating, by a femto access point device comprising a processor, a presentation of recommendation data that represents a set of communication devices that are coupled to the femto access point device, wherein the set of communication devices is selected based on availability data associated with respective resources of the set of communication devices;
    as a function of the facilitating, receiving, by the femto access point device, input data that selects a first communication device of the set of communication devices, to which communication data that is directed to a second communication device of the communication devices is to be routed; and
    in response to directing, based on determining that the second communication device is located within a defined distance from the femto access point device, the communication data, that is received from a macro network device, to the first communication device, facilitating, by the femto access point device, a transmission of identifier data that is indicative of an identifier associated with the first communication device, to the second communication device.

14. The method of claim 13, wherein the receiving the communication data comprises receiving advertisement data and the directing comprises directing, to the first communication device, the advertisement data in response to determining that a timing criterion is satisfied.

15. The method of claim 13, further comprising:
receiving, by the femto access point device, authentication information via an interface; and
validating, by the femto access point device, the authentication information wherein the facilitating the presentation comprises facilitating the presentation subsequent to the validating.

16. The method of claim 13, wherein the determining that the second communication device is located within the defined distance comprises determining global positioning system data associated with the second communication device.

17. The method of claim 13, further comprising:
selecting, by the femto access point device, the set of communication devices based on respective capability data associated with the set of communication devices.

18. A computer-readable storage device comprising computer-executable instructions that, in response to execution, cause a femto access point device comprising a processor to perform operations, comprising:
facilitating a presentation of recommendation data that represents a set of communication devices that are coupled to the femto access point device, wherein the set of communication devices is selected based on availability data associated with respective resources of the set of communication devices;
as a function of the facilitating, receiving input data that selects a communication device of the set of communication devices, to which communication data that is directed to a mobile device associated with the femto access point device is to be routed; and
in response to receiving the communication data via a macro network device and determining that the mobile device is located within a coverage area of the femto access point device, facilitating a routing of the communication data to the communication device,
wherein the identifier data indicative of an identifier associated with the communication device is transmitted to the mobile device via the femto access point device.

19. The computer-readable storage device of claim 18, wherein the communication data comprises advertisement data indicative of an advertisement.

20. The computer-readable storage device of claim 19, wherein the facilitating the routing comprises directing the advertisement data to the communication device in response to determining that a timing criterion has been satisfied.

21. The computer-readable storage device of claim 18, wherein the determining that the mobile device is located within the coverage area comprises determining, based on global positioning system data, location data indicative of a location of the mobile device.

22. The computer-readable storage device of claim 18, wherein the determining that the mobile device is located within the coverage area comprises determining that the mobile device is coupled to the femto access point device.

* * * * *